(12) United States Patent
Gaeddert et al.

(10) Patent No.: US 8,430,427 B1
(45) Date of Patent: Apr. 30, 2013

(54) COUNTERWEIGHT APPARATUS FOR VEHICLES

(75) Inventors: Thomas J. Gaeddert, Newton, KS (US); Derek Jordan Christophel, Wichita, KS (US)

(73) Assignee: Excel Industries, Inc., Hesston, KS (US)

( * ) Notice: Subject to any disclaimer, the term of this patent is extended or adjusted under 35 U.S.C. 154(b) by 0 days.

(21) Appl. No.: 13/489,822

(22) Filed: Jun. 6, 2012

Related U.S. Application Data

(60) Provisional application No. 61/493,772, filed on Jun. 6, 2011.

(51) Int. Cl.
*B60S 9/00* (2006.01)

(52) U.S. Cl.
USPC ............................ 280/759; 212/195; 414/673

(58) Field of Classification Search .................. 280/759, 280/757, 758; 212/178, 195, 196; 414/719, 414/673; 172/611, 272
See application file for complete search history.

(56) References Cited

U.S. PATENT DOCUMENTS

| | | |
|---|---|---|
| 2,701,728 A | 2/1955 | Miller et al. |
| 3,492,019 A | 1/1970 | Folkerts et al. |
| 3,635,493 A | 1/1972 | Barth et al. |
| 3,700,256 A | 10/1972 | Jones |
| 3,709,520 A | 1/1973 | Johnson et al. |
| 3,730,545 A | 5/1973 | Allori |
| 3,822,073 A | 7/1974 | Sieren |
| 3,888,507 A | 6/1975 | Berghausen |
| 3,944,252 A | 3/1976 | Barth |
| 4,094,534 A | 6/1978 | Welke et al. |
| 4,299,405 A | 11/1981 | Withers et al. |
| 4,462,611 A | 7/1984 | Sieren |
| 4,537,423 A | 8/1985 | Nau et al. |
| 4,622,806 A | 11/1986 | Bahnman et al. |
| 5,219,180 A * | 6/1993 | Zipser et al. .................. 280/759 |
| 5,255,931 A | 10/1993 | Hulburt |
| D355,423 S | 2/1995 | Woods et al. |
| 5,709,523 A | 1/1998 | Ware |
| 6,035,941 A | 3/2000 | Hirooka et al. |
| D436,969 S | 1/2001 | Moehle et al. |
| 6,533,319 B1 | 3/2003 | Denby et al. |
| 6,722,113 B2 | 4/2004 | Atterbury et al. |
| 7,354,066 B2 * | 4/2008 | Yamamoto .................... 280/759 |
| 7,513,529 B2 | 4/2009 | Defrancq |
| 7,618,062 B2 | 11/2009 | Hamm |
| 7,658,293 B2 | 2/2010 | Yamamoto et al. |
| 8,118,326 B2 * | 2/2012 | Moore .......................... 280/759 |
| 2002/0014506 A1 | 2/2002 | Teich |

\* cited by examiner

*Primary Examiner* — Drew Brown

(57) ABSTRACT

An improved counterweight apparatus for vehicles includes a counterweight support structure, a set of separately installable and removable counterweights and a retaining plate. Each counterweight is shaped to be received by the counterweight support structure and each counterweight has at least one retaining plate surface. The retaining plate is retained adjacent to the counterweight support structure and can be moved between a retracted position and an advanced position. The retaining plate has a first surface located to register with the retaining plate surface of each counterweight. When a counterweight is placed in the counterweight support structure and the retaining plate is moved to the advanced position, the first surface of the retaining plate engages the retaining plate surface of the counterweight to secure the counterweight support structure. A counterweight can be removed from the counterweight support structure if the retaining plate is moved to the retracted position.

10 Claims, 6 Drawing Sheets

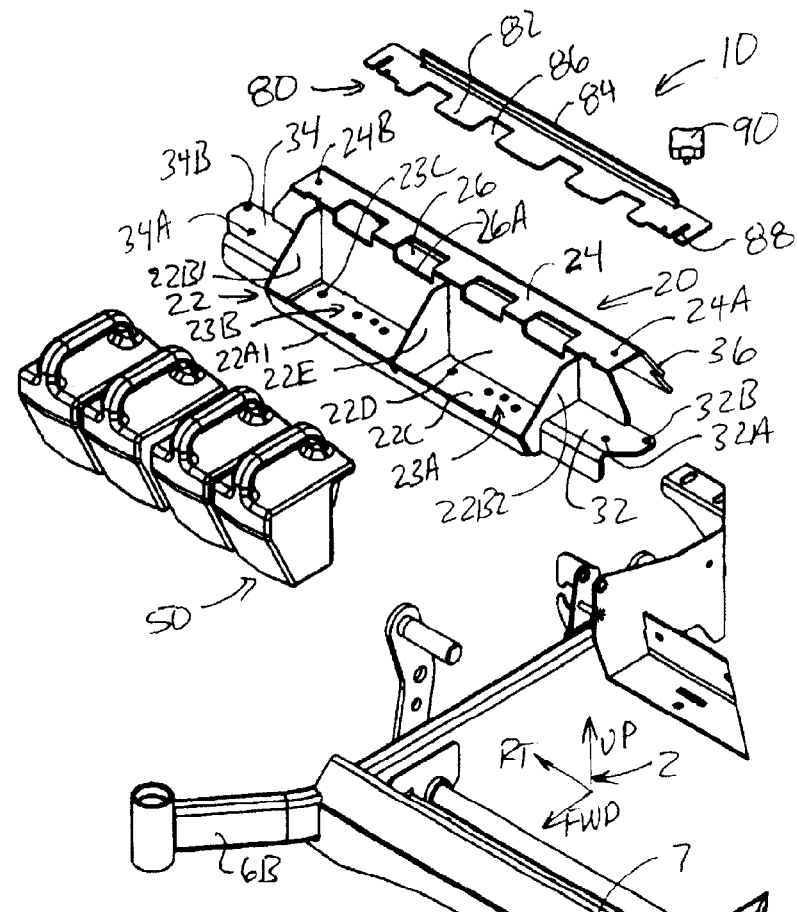
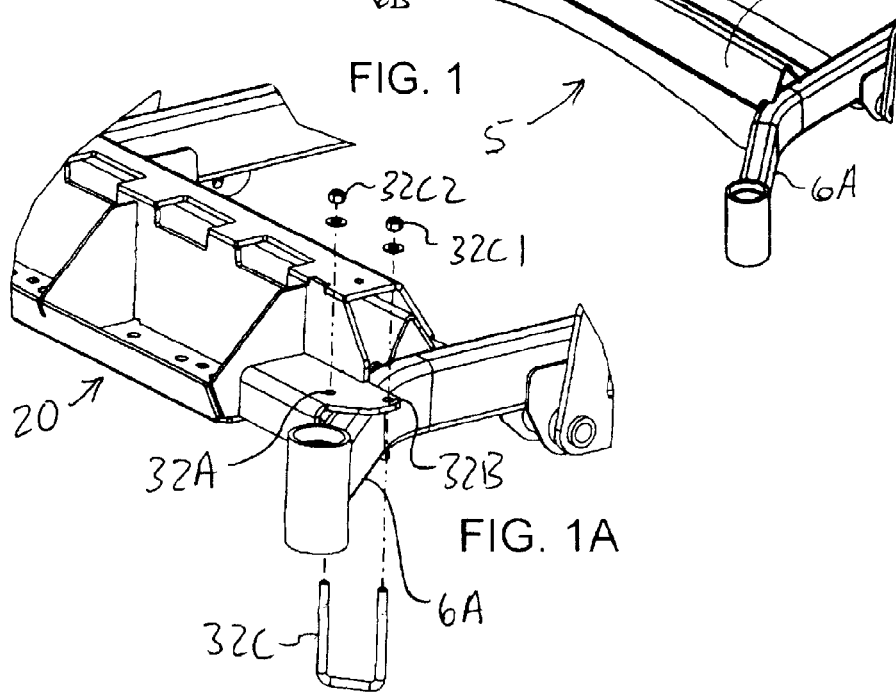
FIG. 1
FIG. 1A

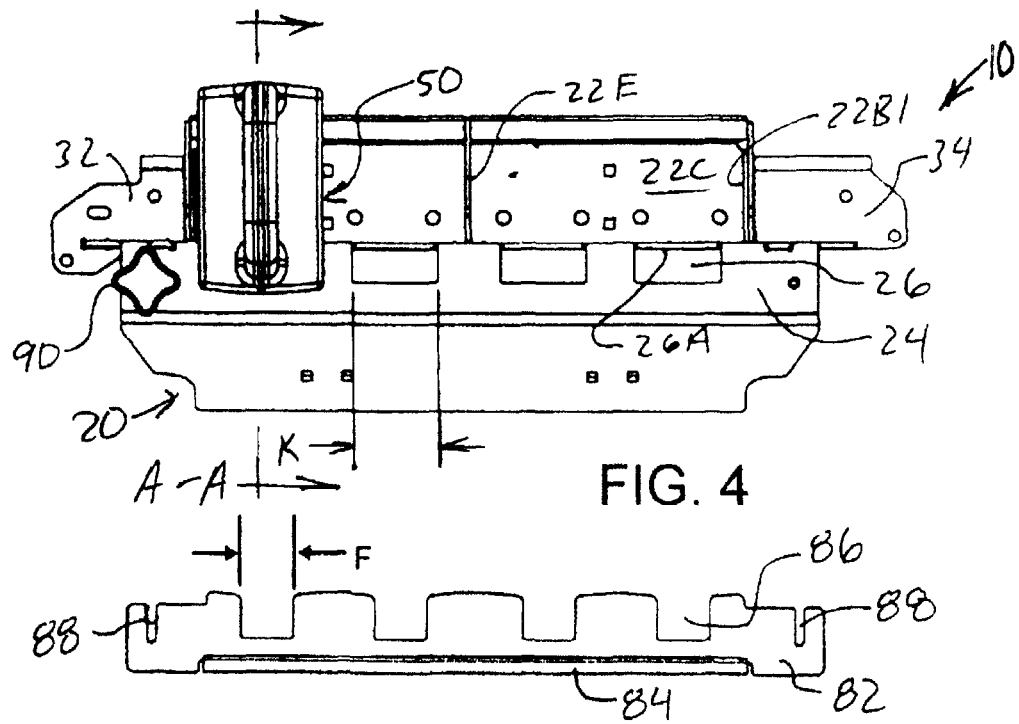
FIG. 4
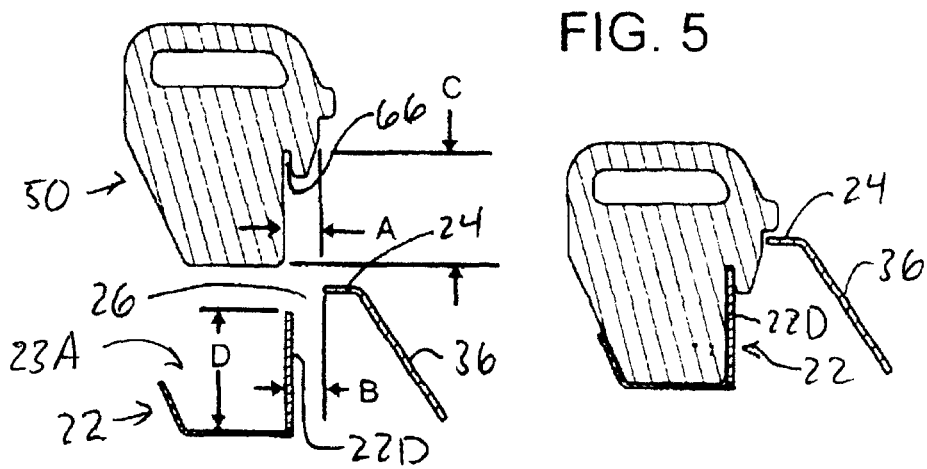
FIG. 5
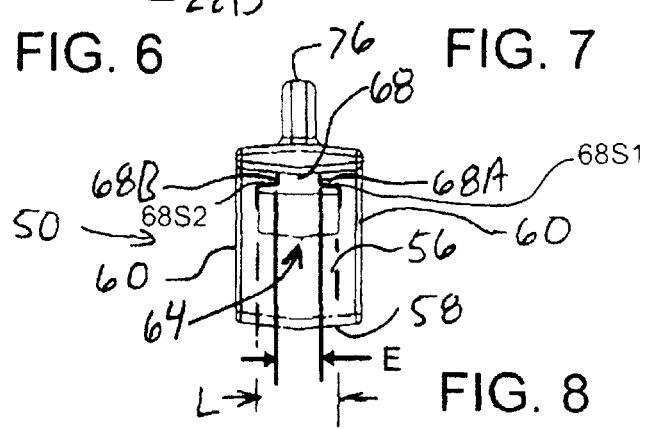
FIG. 6  FIG. 7
FIG. 8

COUNTERWEIGHT APPARATUS FOR VEHICLES

RELATED APPLICATION

This application claims the benefit of U.S. Provisional Patent Application Ser. No. 61/493,772 filed on Jun. 6, 2011 which is incorporated herein by reference.

FIELD

This invention relates to a vehicle counterweight apparatus.

BACKGROUND

Counterweights are used to balance vehicles such as riding lawnmowers. Counterweights are used when a riding lawnmower or tractor carries an attachment that causes the vehicle to become unbalanced. A counterweight apparatus works best for an operator if it is versatile and easy to use. A counterweight apparatus is versatile if it is possible to mount one, some or all of a set of generally identical counterweights. It is preferable that the individual counterweights be generally identical, heavy enough to provide a significant counterweight for the vehicle and relatively easy to install and remove.

SUMMARY

A counterweight apparatus for a vehicle addresses the above described needs relating to versatility and ease of use. The present counterweight apparatus includes a counterweight support structure, a set of separately installable and removable counterweights and a retaining plate. The counterweight support structure is fixed to the vehicle. The set of counterweights includes a plurality of counterweights. Each counterweight is shaped to be received by the counterweight support structure and each counterweight has at least one retaining plate surface. The retaining plate is retained adjacent to the counterweight support structure and can be moved between a retracted position and an advanced position. The retaining plate has a first surface located to register with the retaining plate surface of each counterweight. When at least one counterweight is placed in the counterweight support structure and the retaining plate is moved to the advanced position, the first surface of the retaining plate engages the retaining plate surface of the counterweight so that the counterweight is secured to the counterweight support structure. A counterweight can be removed from the counterweight support structure if the retaining plate is moved to the retracted position.

DESCRIPTION OF THE DRAWINGS

FIG. 1 is a first perspective view of the apparatus for mounting counterweights.

FIG. 1A is a perspective view showing how the apparatus for mounting counterweights is mounted to a lawnmower frame.

FIG. 4 is a top view of a counterweight mounted in a counterweight support structure.

FIG. 5 is a top view of a retaining plate.

FIG. 6 is a cross-section view of a counterweight shown raised above a cross-section view of the counterweight support structure.

FIG. 7 is a cross-section view of a counterweight and the counterweight support structure taken from plane A-A indicated in FIG. 4.

FIG. 8 is a second rear view of a counterweight showing additional dimension indicators.

DETAILED DESCRIPTION

Figure 2:
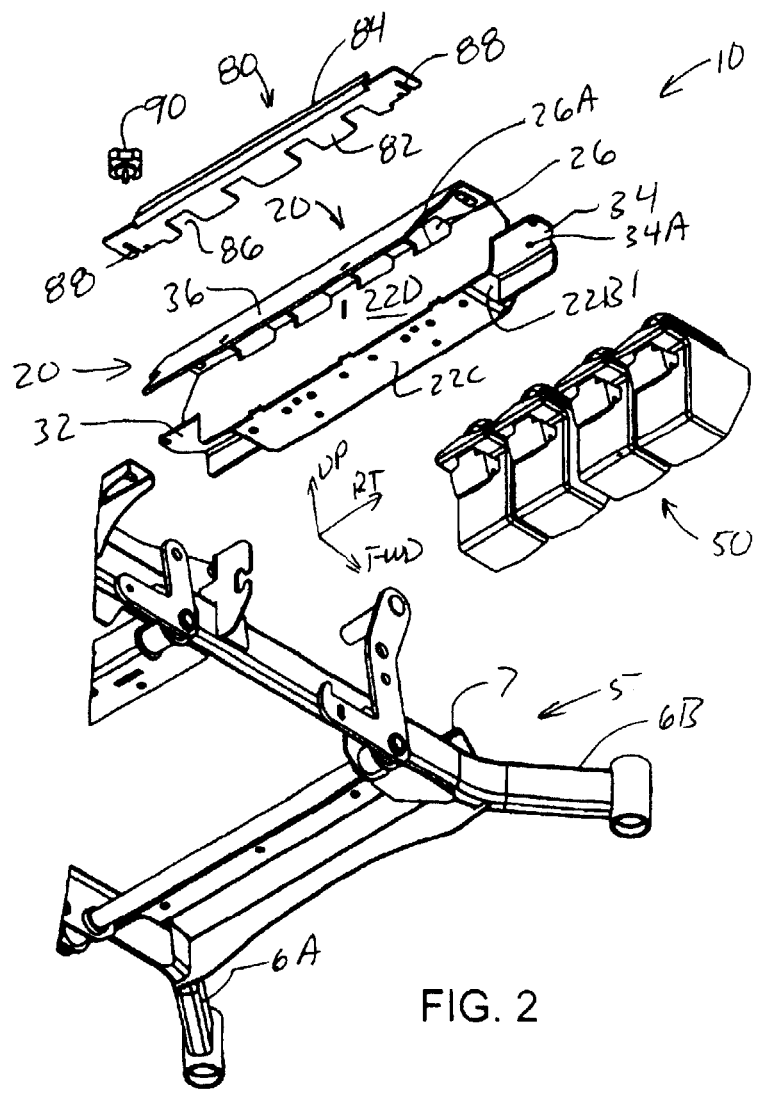
FIG. 2 is a second perspective view of the apparatus for mounting counterweights.

Referring to the drawings, FIG. 1 shows an example embodiment of the counterweight apparatus 10 shown exploded away from riding lawnmower frame 5. Riding lawnmower frame 5 is shown without wheels and other equipment for clarity and will be easily identifiable by those skilled in the art as the frame of a riding lawnmower. Lawnmower frame 5 is shown in FIG. 1 to include at least forward wheel support members 6A and 6B as well as a transverse frame member 7. Counterweight apparatus 10 includes a counterweight support structure 20, counterweights 50 and a retaining plate 80. Direction arrows 2 in FIG. 1 provide the orientation of mower frame 5 as well as counterweight support structure 20, counterweights 50 and retaining plate 80.

As can be seen in FIG. 1, in this example, counterweight support structure 20 includes a bay portion 22 which is defined by a forward wall 22A1, two side walls 22B1 and 22B2, a floor 22C, and a back wall 22D. A divider 22E divides bay portion 22 into two preferably identical bay recesses 23A and 23B. In this example, eight evenly spaced rubber pads 23C are located at the bottom of each bay recess 23A and 23B. Accordingly, two rubber pads 23C provide a cushion for the bottom surface of each counterweights 50 as can be best seen in FIGS. 7 and 9A.

In this example, each bay recess 23A and 23B is shaped and sized to receive and support two counterweights 50. Accordingly, in this example, counterweight support structure 20 is adapted to support four generally identical counterweights 50. An example counterweight 50 will be described in greater detail below. Counterweight support structure 20 also includes an elongated generally horizontal ledge flange 24 generally extending back from the upper edge of back wall 22D of bay portion 22. Ledge flange 24 also extends to the right and to the left in the area behind bay portion 22. Evenly spaced generally identical anchor openings 26 are defined in ledge flange 24 adjacent to back wall 22D. Each anchor opening 26 exposes an edge portion 26A of back wall 22. As will be explained in greater detail below, anchor openings 26 are arranged to receive anchor portions that project from counterweights 50.

In this example, counterweight support structure 20 also includes side support members 32 and 34 extending from either side of bay portion 22 as well as a back flange 36 extending diagonally down and away from ledge flange 24. These structural elements are arranged to be fastened or bolted to structural elements at the forward end of mower frame 5. Generally, counterweights 50 are mounted to the forward end of a mower frame 5 to counterbalance equipment mounted to the back end of a riding mower, such as, for example, a grass catcher assembly. In this example, in order to secure counterweight support structure 20 to frame 5, fastener holes 32A and 32B and 34A and 34B may be defined in side support members 32 and 34 respectively and are preferably located to align with a U-bolt such as U-bolt 32C shown in FIG. 1A. As can be seen in FIG. 1A, U-bolt 32C fits around forward wheel support member 6A which is fastened and clamped in place by nuts 32C1 and 32C2 on the threaded ends of U-bolt 32C. A generally symmetrically identical U-bolt arrangement is present on the opposite side of frame 5 but is now shown in FIGS. 1 and 1A. Back flange 36 of counterweight support structure 20, in this example, is arranged to be fastened to transverse frame member 7. Generally, it is sufficient that counterweight support structure 20 is either part of frame 5 or is otherwise fixed to frame 5. Weight support structure 20, in this example, may be fashioned from sheet steel parts that are cut out and, for some of the above described features, brake formed and subsequently welded together using processes that are well known to those skilled in the art.

Each counterweight 50 is configured to be handled by an operator and is designed such that its weight is manageable by an operator. Preferably, each counterweight 50 may weigh approximately 40 Lbs. or may have some other suitable weight depending on the amount of counter-weighting needed. Accordingly, with the example embodiment shown in FIGS. 1 and 2, if such embodiment includes weights weighing 40 Lbs. each, counterweight apparatus 10 may be used to provide a balancing force of approximately 40, 80, 120 or 160 pounds depending on whether one, two, three or four counterweights 50 are mounted to counterweight support structure 20. In this example, counterweights 50 are sufficiently identical so that counterweights 50 can be used interchangeably. Preferably, each counterweight 50 is fashioned from cast iron or a similar dense cast material.

FIGS. 3A-3D provide various views of a counterweight 50. Direction arrows are given in FIG. 3A to show the orientation of counterweight 50 when it is placed in counterweight support structure 20. As can be best seen in FIGS. 3A-3D, each counterweight 50 has a body portion 52, an upper ledge portion 62, an anchor portion 64 and a handle 76. Upper ledge portion 62 projects back from the top of body portion 52. In this example, anchor portion 64 projects rearwardly from body portion 52 and down from upper ledge portion 62. In this example, each body portion 52 of each counterweight 50 preferably has a front face 54, a back face 56, a bottom face 58, a top face 59 and parallel sides 60 extending between the front, back, bottom and top faces 54, 56, 58 and 59. Preferably, sides 60 are generally parallel so that a plurality of counterweights 50 may be fit side by side into bay recesses 23A and 23B described above. In this example, handle 76 extends from top face 59 to facilitate handling. Front, back and bottom faces 54, 56 and 58 are arranged to generally fit the inside surfaces of each recess 23A and 23B of counterweight support structure 20 as shown in FIGS. 6, 7, 9A and 9B.

As noted above anchor portion 64 extends from back face 56 and downwardly from upper ledge portion 62. Anchor portion 64 includes a lower portion that is spaced away from back face 56 so that the lower portion of anchor portion 64 and back face 56 define a downwardly opening transverse, upright slot 66 which can be best seen in FIG. 3D. Upright slot 66 is given a width sufficient for receiving the exposed edge portion 26A of back wall 22D of weight tray 22 as can be best seen in FIGS. 6, 7 and 9A. As can be seen in FIG. 6, the vertical dimension of back wall 22D at anchor opening 26 indicated as dimension D is generally slightly greater than dimension C indicated on counterweight 50. Moreover, as shown in FIG. 6, the longitudinal dimension B between the front surface of back wall 22D and the back edge of anchor opening 26, in this example, is preferably slightly larger than dimension A indicated in FIG. 6 as extending between back surface 56 and the back surface of anchor portion 64. Also, dimension K given in FIG. 4 indicating the width of opening 26 must be sufficiently large to allow passage of anchor portion 64 having a width indicated by dimension L in FIG. 8. Thus, dimension K must be equal to or greater than dimension L. Accordingly, anchor portion 64 of each counterweight 50 is shaped and sized to fit into one the above described anchor openings 26 of bay portion 22 such that slot 66 of counterweight 50 receives the exposed edge portion 26A of back wall 22D of bay portion 22 as counterweight 50 rests in one of bay recesses 23A or 23B. Still further, in this example, the width of anchor portion 64 as indicated by dimension L in FIG. 8 is preferably sized to be slightly less than the width of anchor opening 26 as indicated by dimension K shown in FIG. 4. The skilled reader may note that a portion of anchor portion 64 immediately above slot 66 also has a width corresponding with dimension L shown in FIG. 8 and that at least this portion of anchor portion 64 fits the portion of anchor opening 26 common to back wall 22D of bay portion 22. Accordingly, when counterweight 50 is received by weight tray 22, because the forward, back and bottom faces of counterweight 50 generally fit into bay portion 22 as described above and because anchor portion 64 is received by an anchor opening 26 as described above, counterweight 50 is constrained from moving forward or backward, and, in this example, is also constrained from moving side to side.

Figure 3A:
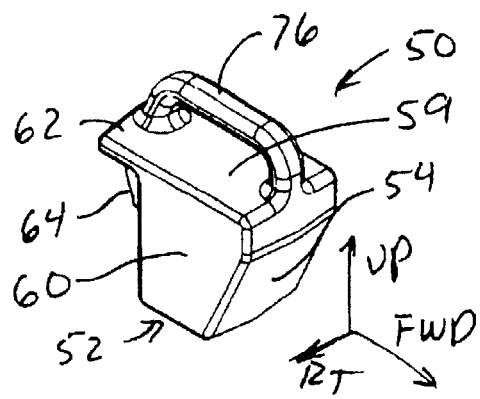
FIG. 3A is a first perspective view of a counterweight.
Figure 3B:
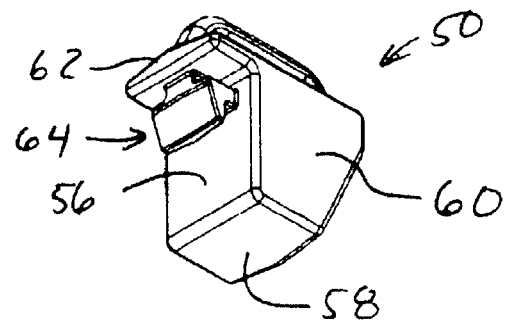
FIG. 3B is a second perspective view of a counterweight.
Figure 3C:
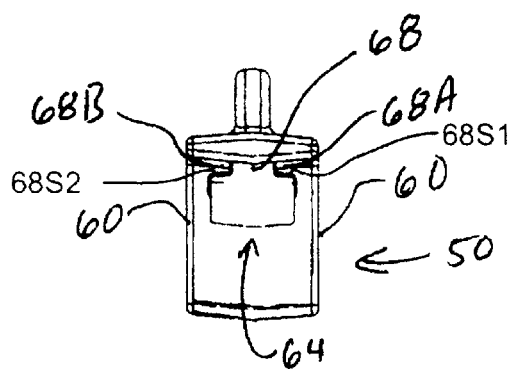
FIG. 3C is a rear view of a counterweight.
Figure 3D:
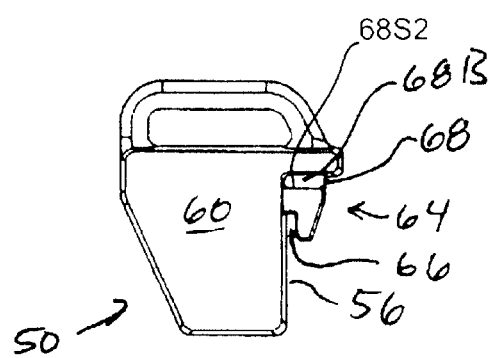
FIG. 3D is a side view of a counterweight.

In this example, anchor portion 64 of each counterweight 50 is reduced in its transverse width to define a neck region 68 that can be best seen in FIGS. 3C and 3D. This neck region 68 presents two generally horizontal, longitudinal anchor slots 68A and 68B which are most clearly indicated in FIG. 3C. In particular slots 68A and 68B present retaining plate surfaces 68S1 and 68S2 respectively which define the lower surfaces of slots 68A and 68B. When a counterweight 50 is seated in one of bay recesses 23A or 23B of counterweight support structure 20, retaining plate surfaces 68S1 and 68S2 of anchor slots 68A and 68B respectively are preferably generally coplanar with the upper surface of the horizontal ledge flange 24 of counterweight support structure 20. The purpose for this alignment will be explained immediately below.

The purpose of retaining plate 80, is to engage the features of anchor slots 68A and 68B of counterweight 50 in order to constrain counterweight 50 from moving up relative to counterweight support structure 20. This is an important function because a riding lawnmower often encounters uneven terrain. While it is useful to be able to quickly install and remove a counterweight 50, it is even more useful to be able to quickly slide retaining plate 80 into place in order to secure a counterweight 50.

Figure 9:
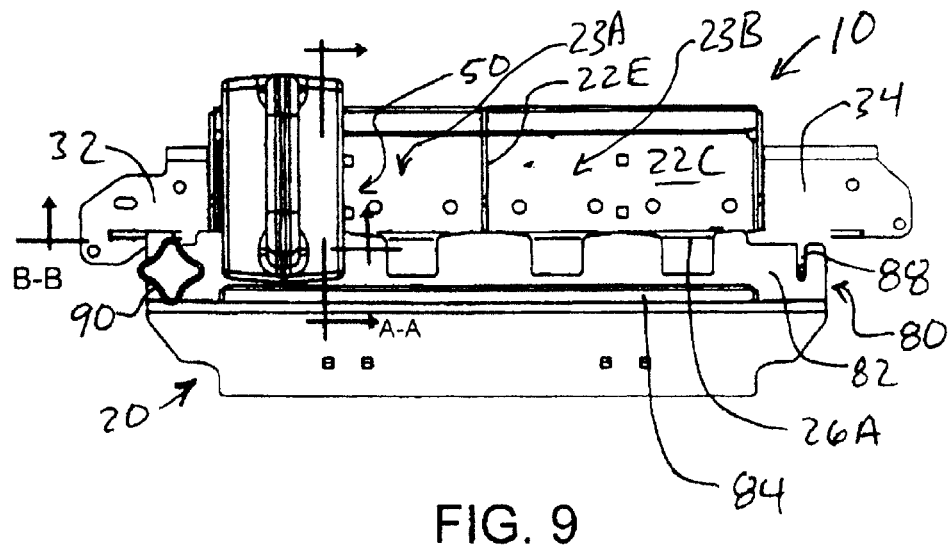
FIG. 9 is a top view of a counterweight installed in the counterweight support structure.
Figure 9A:
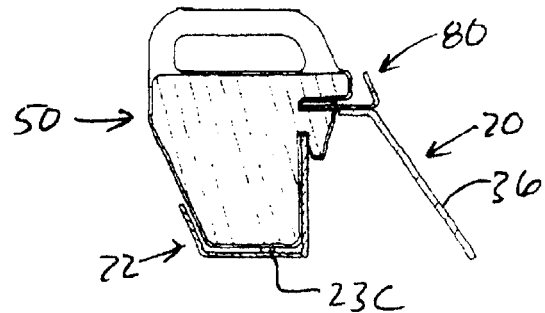
FIG. 9A is a cross-section view of a counterweight installed in the counterweight support structure taken from plane A-A of FIG. 9.
Figure 9B:
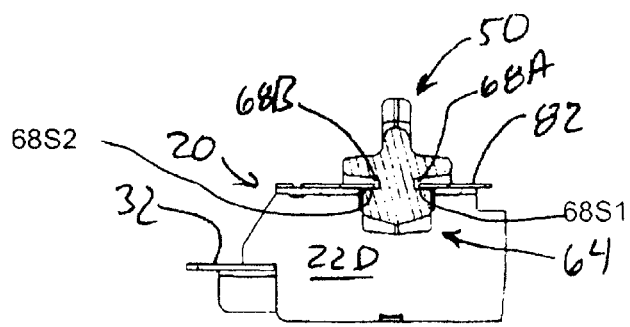
FIG. 9B is a cross-section view of a counterweight installed in the counterweight support structure taken from plane B-B of FIG. 9.
Figure 10:
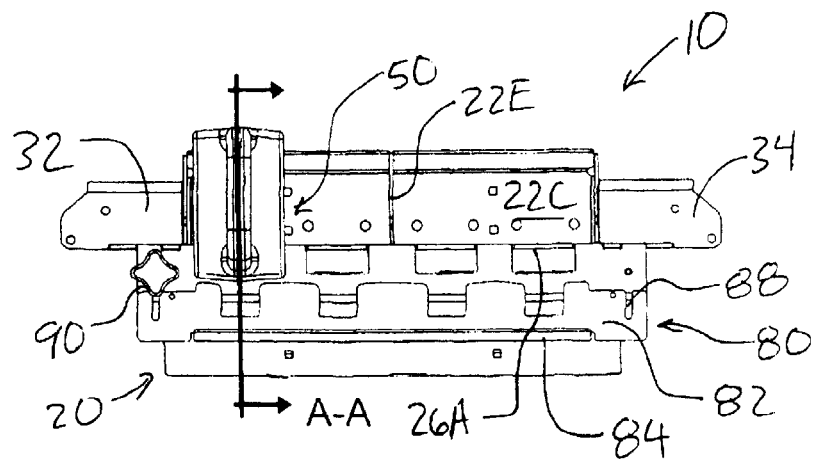
FIG. 10 is a top view of a counterweight installed in the counterweight support structure with the retaining plate in a refracted position.
Figure 10A:
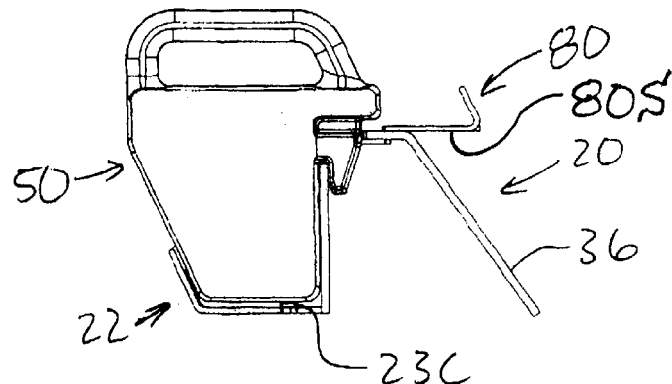
FIG. 10A is a cross-section view of a counterweight installed in the counterweight support structure with the retaining plate in the retracted position taken from plane A-A of FIG. 10.

Retaining plate 80 includes a horizontal flange 82 that is designed to lie on top of the upper surface of ledge flange 24 of the counterweight support structure 20. Retaining plate 80, in this example, has an upwardly projecting flange 84 to impart structural rigidity to retaining plate 80. Horizontal flange 82 is profiled to have a series of shaped portions, which, in this example, are cutouts 86. Each cutout 86 of retaining plate 80 is arranged and located such that when a counterweight 50 is placed in a recess 23 of support structure 20 as shown in FIG. 4 and retaining plate 80 is in the advanced position as shown in FIG. 9, one of cutouts 86 will engage neck region 68 of anchor portion 64 of a counterweight 50. As a neck region 68 of counterweight 50 is received by cutout 86, the material on either side of cutout 86 is also received by anchor slots 68A and 68B of counterweight 50. Still further, in this example, the generally flat lower surface 80S of retaining plate 80 (indicated as 80S in FIG. 10A), if placed on the upper surface of ledge flange 24, registers with retaining plate surfaces 68S1 and 68S2 (indicated in FIGS. 3C, 3D and 8) defining the lower walls of slots 68A and 68B (indicated in FIGS. 3C, 3D, 8 and 9B). Thus, if retaining plate 80 is in the advanced position shown in FIGS. 9 and 9A cutouts 86 (shown in FIG. 1) receive the material between slots 68B1 and 68B2, counterweight 50 is constrained from moving (at least by any significant distance) if retaining plate 80 is secured to counterweight support structure 20 as will be described below.

In this example, retaining plate 80 is releasably secured to ledge flange 24 of support structure 90 by a pair of threaded clamp bolts 90 which are attached at opposite ends of ledge flange 24. Clamp bolts 90 are threaded into corresponding threaded holes 24A and 24B. Retaining plate 80, at its opposite ends, presents a correspondingly spaced pair of clamp slots 88. Accordingly, when retaining plate 80 is in the advanced position shown in FIGS. 9 and 9A and clamp bolts 90 which are captured by clamp slots 88 are tightened, retaining plate 80 is secured in the advanced position and a counterweight 50, if present in support structure 20 as shown in FIG. 9, will be secured in support structure 20. When clamp bolts 90 are loosened, retaining plate 80 may be slid to the retracted position shown in FIGS. 10 and 10A as slots 88 slide relative to clamp bolts 90. When retaining plate 80 is in the retracted position shown in FIGS. 10 and 10A, a counterweight 50 may be either added to or removed from support structure 20.

As can be understood from the above description, counterweight apparatus 10 provides a way to balance a vehicle when various attachments are added to the vehicle causing an unbalanced condition. The configuration of counterweight apparatus 10 provides a structure for receiving and securing a series of counterweights ranging from one counterweight 50 to four counterweights 50, and, in this example, ranging between 40 lbs. and 160 lbs. Further, counterweight apparatus 10 provides a way to quickly install or remove counterweights 50 while providing a way to secure installed counterweights 50.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A counterweight apparatus for a vehicle, comprising:
   (a) a counterweight support structure,
   (b) a plurality of counterweights, each counterweight having an anchor portion shaped to be received by the counterweight support structure,
   (c) a retaining plate movably retained adjacent the counterweight support structure so as to be movable between retracted and advanced positions, the retaining plate having shaped portions that will individually intersect with and lock said anchor portions of said counterweights received on the counterweight support structure when said retaining plate is moved into the advanced position, and will retract away therefrom and unlock each counterweight in the refracted position.

2. The counterweight apparatus as in claim 1 wherein said retaining plate is positioned adjacent a side of the counterweights when placed on the counterweight support structure.

3. The counterweight apparatus as in claim 1 wherein each anchor portion includes a shaped structure and the retaining plate includes a complimentary portion for engaging each shaped structure of each anchor portion.

4. The counterweight apparatus as in claim 1 wherein said retaining plate is positioned externally of the counterweights and on a side thereof when in the refracted position.

5. The counterweight apparatus as in claim 1 wherein the retaining plate slides horizontally between the refracted and advanced positions.

6. A counterweight apparatus for a vehicle, comprising:
   (a) a counterweight support structure mounted to the vehicle,
   (b) a plurality of counterweights, each counterweight shaped to be received by the counterweight support structure, each counterweight having at least one retaining plate surface,
   (c) a retaining plate movably retained adjacent the counterweight support structure so as to be movable between retracted and advanced positions, the retaining plate having a first surface located to register with the at least one retaining plate surface of the counterweight, the first surface of the retaining plate engaging the at least one retaining plate surface of the counterweight when the counterweight is placed in the counterweight support structure and the retaining plate is in the advanced position thereby securing the counterweight to the counterweight support structure and each counterweight released for removal from the counterweight support structure when the retaining plate is in the retracted position.

7. The counterweight apparatus as in claim 6 wherein said at least one retaining plate is positioned adjacent a side of the counterweights when placed on the counterweight support structure.

8. The counterweight apparatus as in claim 6 wherein the retaining plate slides horizontally between the refracted and advanced positions.

9. A counterweight apparatus for vehicles, comprising:
   (a) a counterweight support structure mounted to the frame of the vehicle, counterweight support structure having at least one anchor opening,
   (b) at least one counterweight having a body portion and an anchor portion, the anchor portion adapted to be received by one of the at least one anchor openings of the counterweight support structure, each anchor opening and the anchor portion arranged such that when the counterweight is placed in the support structure with anchor portion received by the anchor opening of the support structure, the counterweight is constrained from moving at least in a first direction, (c) a retaining plate that is associated with the counterweight support structure, the retaining plate operable for being secured in an advanced position and for being released to a retracted position, at least one of the retaining plate and the at least one counterweight having a one notch operable for engaging a corresponding feature on the other of the retaining plate or the at least one counterweight such that when the counterweight is placed in the support structure and the retaining plate is in the advanced position, the counterweight is constrained from moving in the first direction, a second direction and a third direction, the at least one counterweight removable from the counterweight support structure when the retaining plate is in the retracted position.

10. An improved counterweight mounting apparatus for vehicles, comprising:

(a) a counterweight support structure adapted for mounting to a frame of a vehicle, the counterweight support structure operable for receiving and supporting the plurality of counterweights, the counterweight support structure also including a plurality of anchor openings (b) at least two generally identical counterweights, each counterweight having a body portion and an anchor portion extending from the body portion, the anchor portion of each counterweight adapted to be received by one of the anchor openings of the counterweight support structure when the counterweight is received by the counterweight support structure, (c) a retaining plate associated with the counterweight support structure that can be secured in an advanced position or released to a retracted position, the retaining plate having a profile and each of the counterweights having features corresponding to the profile of the retaining plate such that when a counterweight is received by the support structure with the anchor portion of the counterweight being received by an anchor opening and the retaining plate is secured in the advanced position, the counterweight is constrained from moving in any one of three directions, the at least one counterweight movable in at least one direction for removing the counterweight from the counterweight support structure when the retaining plate is in the retracted position.

* * * * *

UNITED STATES PATENT AND TRADEMARK OFFICE
CERTIFICATE OF CORRECTION

PATENT NO.        : 8,430,427 B1                                    Page 1 of 1
APPLICATION NO.   : 13/489822
DATED             : April 30, 2013
INVENTOR(S)       : Gaeddert et al.

It is certified that error appears in the above-identified patent and that said Letters Patent is hereby corrected as shown below:

In the Specification

Col. 2, line 23, "refracted" should read --retracted--.

In the Claims

Col. 6, claim 1, line 12, "refracted" should read --retracted--.

Col. 6, claim 4, line 23, "refracted" should read --retracted--.

Col. 6, claim 5, line 25, "refracted" should read --retracted--.

Col. 6, claim 8, line 53, "refracted" should read --retracted--.

Signed and Sealed this
Eighteenth Day of February, 2014

Michelle K. Lee
*Deputy Director of the United States Patent and Trademark Office*